Oct. 13, 1925.  
C. W. AVERY ET AL  
1,556,665  
ART OF PRODUCING CONTINUOUS SHEET GLASS  
Filed April 13, 1922  3 Sheets-Sheet 1
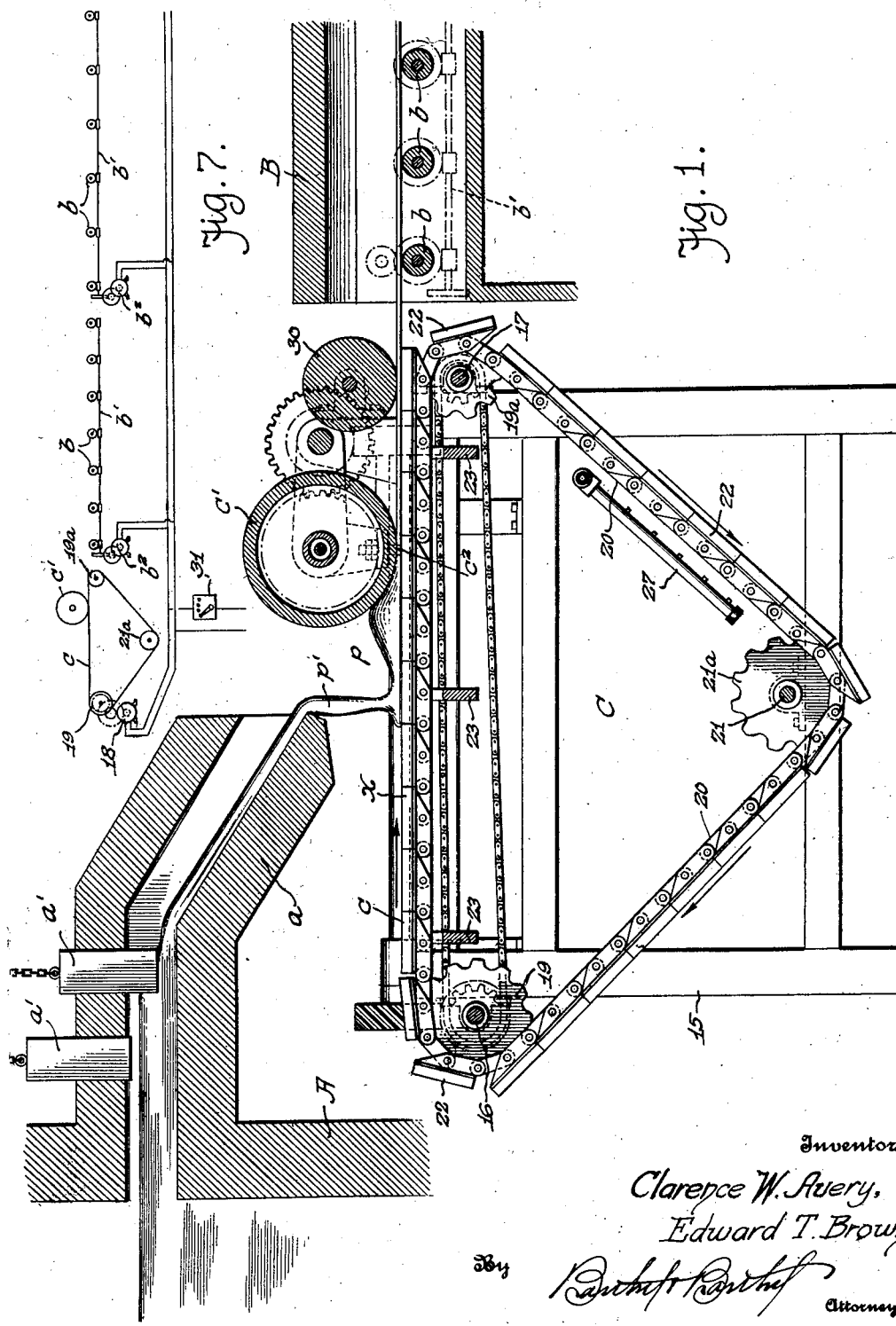
Inventors  
Clarence W. Avery,  
Edward T. Brown,  
By  
Attorneys

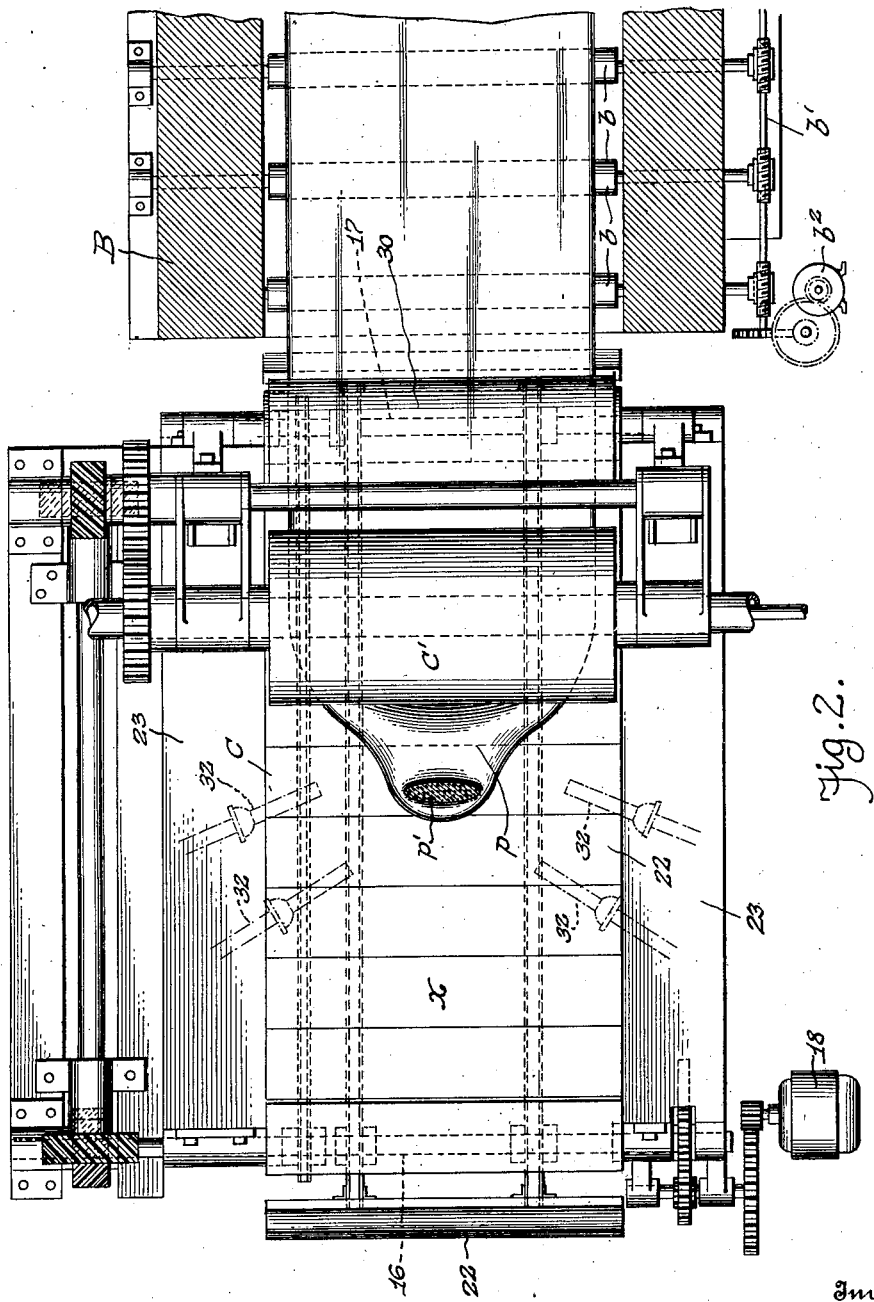

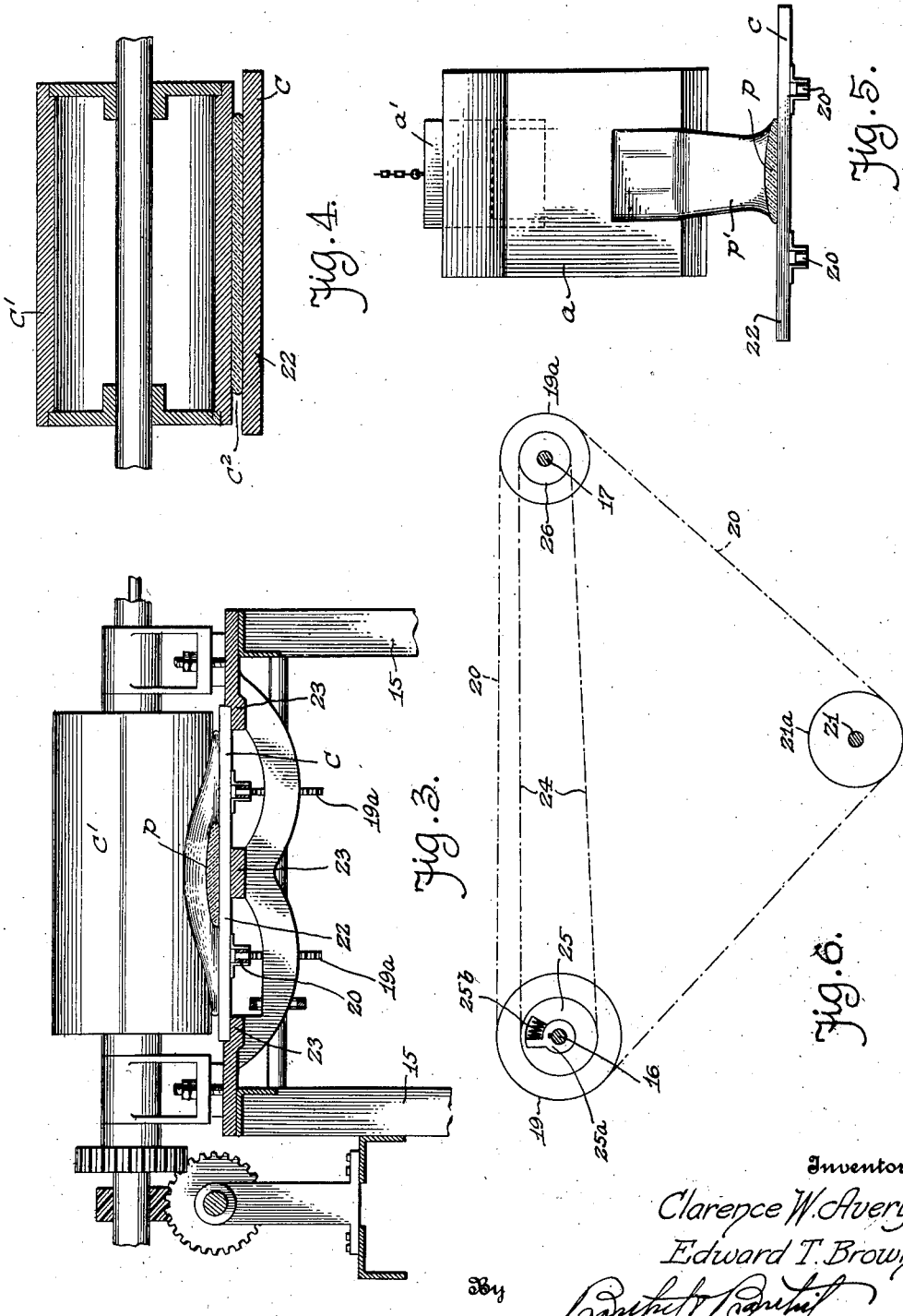

Patented Oct. 13, 1925.

1,556,665

UNITED STATES PATENT OFFICE.

CLARENCE W. AVERY AND EDWARD T. BROWN, OF DETROIT, MICHIGAN, ASSIGNORS TO FORD MOTOR COMPANY, OF DETROIT, MICHIGAN, A CORPORATION OF DELAWARE.

ART OF PRODUCING CONTINUOUS SHEET GLASS.

Application filed April 13, 1922. Serial No. 552,095.

*To all whom it may concern:*

Be it known that we, CLARENCE W. AVERY and EDWARD T. BROWN, citizens of the United States, residing at Detroit, in the county of Wayne and State of Michigan, have invented certain new and useful Improvements in the Art of Producing Continuous Sheet Glass, of which the following is a specification.

This invention relates to improvements in the art of producing sheet glass in continuous lengths, pertaining more particularly to the production of sheets having characteristics of the plate glass type.

Glass sheets of the plate glass type—sheets having a finished thickness, for instance of one-fourth inch—are generally produced by the "casting" process, in that the molten glass or metal is dumped on to a flat table and then rolled to a size of excess thickness, after which the sheet is subjected to a grinding and polishing action to produce the finished transparent plate. To produce plates of any material size in surface dimension, the table must be of correspondingly large size—it is generally as large as can be conveniently secured and employed—thus exposing a large surface to the sheet material during the casting period. Sheets formed in this way are generally cast extra heavy in thickness—the sheet which produces the one-fourth inch finished plate is cast with a thickness of one-half inch—due to the fact that the expansion and contraction effect, together with other inherent characteristics, tend to set up conditions which may be or are similar to the conditions of warping at points on the table; these conditions are more or less inherent and cannot be controlled definitely, the result being that the sheet must have an initial thickness such as will permit grinding off of sufficient amount of the sheet surfaces to eliminate the faults set up because of these inherent conditions. As will be understood, the larger the dimensions of the sheet the greater becomes the difficulty referred to.

As a result of these conditions it becomes evident that with the one-fourth inch finished product, for instance, the molten glass—required to produce it is substantially double that found in the finished product, this excess being then ground off— substantially fifty per centum (one-eighth inch) on each side, thus bringing into the factor of cost of production of the finished sheet not only the quantity of molten glass employed, but also the time and labor factor involved in removing this excess quantity.

Efforts have been made to produce the continuous sheet by rolling between rolls using a substantially vertical sheet pass in the rolls, but such structures introduce the factor of gravity—if the metal is first delivered into a pool at the throat of the pass—and thus tend to set up a more or less forced arrangement of particles or molecules of the molten metal, due to the necessity of employing confining walls to the pool and the constantly-added supply on the upper surface of the pool producing the weight or gravity factor which tends to produce this forced arrangement of the component parts of the mass passing into and through the pass.

Many other ways have been attempted, those referred to being thus described because of the emphasis these place to the characteristics of the present invention which pertains more particularly to the solution of the problems involved by the use of the "casting" method type of operation rather than the drawing method, in that the characteristics of a pool are employed, but the pool, as well as the pass, are of unconfined characteristic.

For the purpose of indicating the general characteristics of the present invention, a brief statement is made of one of its embodiments that is in service and producing continuous sheets which, as the sheet emerges from the leer is cut into the proper lengths and then subjected to the grinding and polishing action to produce the finished product. The installation produces finished sheets of one-fourth inch thickness, the sheet, however, being formed of a thickness of three-eighth inch—as compared to the one-half inch of the usual casting process—thus setting up a saving of 25% in the amount of material employed in the production of sheets of equal length and width as between the installation and the usual casting process, and a saving in the time and labor in the grinding and polishing, due to the fact that only 50% of the sheet is wasted by grinding and polishing as compared with the 100% amount of the casting process, the percentages being on the basis of the thickness of the finished product, the waste in the usual casting process being equal in thickness to that of the final product.

In the installation referred to the melting and refining chamber have a capacity of approximately sixteen tons of molten metal every 24 hours, the discharge spout having an active width of flowing metal of approximately eight inches. The melting chamber is charged with the raw materials at regular intervals and in amounts such as to maintain the content between approximate and minimum amount limits.

The leer is in excess of four hundred and fifty feet in length, and its entrance is spaced less than ten feet—the distance is about five and a half feet—from the discharge end of the spout from the refining chamber. The leer supports the sheet on rollers, positively driven at speeds such as to prevent any piling up of the sheet within the leer under normal operation, the rollers being arranged in series of units with the unit spacing differing in a gradually increasing distance ratio.

The sheet is three-eighth inch in thickness, and its width is substantially twenty-five inches. The sheet advances at the rate of approximately twenty-eight inches per minute. At the outer end of the leer the sheet is cut into regular lengths, the product being employed in the production of windshield sections, etc.; the cut lengths are then subjected to a grinding and polishing action which leaves them one-fourth inch thick, the loss in thickness being one-eighth inch (50%) in thickness in the grinding and polishing action, the lengths being ground and polished on both faces.

The portion of the installation that bears more particularly on the present invention is that between the discharge spout and the entrance to the leer, the portion of the apparatus within the few feet between these parts. It is here that the sheet is formed.

The table is in the form of an endless element made up of connected sections having a horizontal flight of a length greater than the distance between the leer and the point of discharge from the spout, the excess length extending beneath the spout; this permits of the table formation being complete in advance of reaching the point where the discharging metal is received. The table forms the lower wall of the pass, the upper wall being formed by a roller supported above the table, the roller being approximately thirteen inches in diameter, the spacing being three-eighth inch. Both roller and table are of greater width than the width of the sheet. For purpose of smoothing out any slight inaccuracies in the upper surface, an additional roller is located beyond the forming roller—between the latter and the leer. The table has its upper surface approximately six inches below the lip of the discharge spout, and the table and roller are driven at synchronous—equal—speeds.

The molten metal from the spout passes downward on to the table by gravity and is advanced to the pass to be formed into the sheet and then advanced into the leer. As will be understood, the horizontal table surface and the curved surface of the roller provide a mouth of decreasing vertical dimension toward the pass, and the positions of the parts are such as to produce, during service, characteristics of a pool of molten metal on the upper surface of the table, the pool being in advance of the pass and extending slightly beyond the point where the metal stream from the spout is moving downward, the result being that the stream passes on to the upper surface of the pool and in flowing maintains the general dimensions of the pool. The amount of metal within the pool appears to be possibly one or one and a half times the quantity that would be contained in an ordinary water pail.

The discharge spout is disposed midway of the length of the roller and width of the table, so that the contour of the pool is symmetrical, having a width at the point of entrance of the stream a little greater than the width of the stream, the width increasing symmetrically on opposite sides as it approaches the pass. The constancy of the pool dimensions is made apparent to the observer through the fact that the table surface appears to be moving steadily forward beneath the pool with the latter appearing to remain stationary; in other words, the appearance would indicate that the content of the pool never changes, whereas the change is actually continuous and constant, the lower portion advancing with the table, the illusion being brought about by the fact that the upper portion of the pool is flowing laterally with such constant uniformity as to constantly replenish that minute section that had advanced, this taking place continuously and giving the appearance of a constant contour.

And in this is to be found one of the principal characteristics of the present invention. The metal is delivered to the table and then permitted to flow gently and non-forcibly into its approximate sheet formation, the mouth of the pass serving to restrain forward movement of the entire pool during motion of the table, so that there is formed an increased thickness of pool as the mouth is approached and reached, thus slightly increasing the effect of gravity and increasing the flow laterally accordingly, but the flow is the natural flow of the metal, with the result that the molecules and particles of the metal arrange themselves in a natural way relative to each other, the treatment not forcing any particular and definite arrangement, but permitting a free and natural flow of the metal.

The result is brought about by the fact that no restraint is applied to the flow. The pass is of greater width than the sheet so that the edges of the sheet are not confined, and no laterally confining walls are provided for the molten metal in advance of the pass, the consistency of the metal being such as to provide for flowing action but with uniformity. It is the lack of any confining walls of any kind that distinguishes the pool of the present invention from the usual meaning of the word "pool"; the content is that which would be found within a depression, but the entire content is above the plane of the top of the table, so that the entire surface of the pool content, excepting that in contact with the table top and that in contact with the face of the roller, is wholly unconfined, thus permitting entire freedom of flow laterally, the flow ending as the pass is reached, all parts being of equal thickness. For want of a better term, we have given the term "unconfined pool" to designate this content.

As will be understood, the consistency of the molten glass or metal is of importance in this connection. The temperature within the spout is approximately 2100° F., while that of the metal forming the pool is approximately 1980° at the point where the stream enters the pool, the additional drop in reaching the pass being comparatively small so that the material has that degree of viscosity which will permit flow at a substantially uniform rate; suitable burners are arranged relative to the exposed surface of the pool in order to prevent chilling of the surface. The consistency is such, therefore, as will permit lateral flow without thinning out of the lateral edge contour of the pool to a point where it would be of less thickness than the depth of the pass, the contour being such as to appear rounded in a cross-section of the pool; this effect is made manifest in the pass where the edges of the sheet are found to be rounded, the rolled sheet having this round edge characteristic, indicating that the flow at no time reaches the knife-blade edge stage.

The distance from the pass to the point of entrance of the stream into the pool is approximately fifteen inches, and it is during the travel of this distance that this free lateral flow takes place; the "heel" of the pool extends beyond this point of entrance, so that the metal of the pool is in contact with the table for a greater distance than this fifteen inches; the reason for this rounded edge appearance is probably to be found in the fact that the zone of contact of metal and table at the heel of the pool is of practically fixed dimensions and is advancing, so that the flowing metal is over the material of this zone laterally as it advances, thus adding to the edges with the added parts brought into contact with a clean portion of the table—thus increasing the zone of contact, the length of travel of the table being timed so that the flow produces a final width approximating uniformity of width of the sheet.

It is obvious, of course, that the consistency of the metal varies substantially constantly as is the case with molten glass being supplied in this manner, and with constant speed conditions in the table and roller, these variations affect the width of the sheet. This can be and is met by a control system for regulating the speed of the table and roller and that of the supports in the leer, as for instance by the use of a rheostat control of the motors which operate these, either manually or automatically; if manual, an attendant measures the sheet width at frequent intervals, changing the speed in presence of variations from a normal width; and this control can be obtained by a suitable detector with which the sheet edges co-operate, and which, through variations in width, will automatically vary the motor speed to compensate for changes in consistency. In the installation referred to, sheet width may vary within a fraction of an inch when operating under manual control, but remains practically constant under the automatic control, the detector being positioned in close proximity to the pass to permit change in speed in immediate succession to the change in consistency becoming manifest in the pass.

Another of the characteristics of the invention will be understood from the above. Flow of metal downwardly under the action of gravity such as to present conditions of pressure is practically restricted to the stream flow from the discharge spout, and this flow is not resisted. The length of such flow, however, is such as to set up material pressure values on the material in the pool pressure values on the material in the pool heel, so that the pool is not disturbed by this constant supply, the pressure being sufficient, however, to cause the lateral flow to begin at once and thus maintain the conditions of the molten metal "bed" on to which the stream is flowing, thus preventing immediate contact of the stream with the table—lateral flow is required before such contact is had. Since all movement of the pool is in the horizontal plane—excepting the lateral flow brought about by the change in depth of the pool toward the roller— gravitation has no material effect on the metal to force it into unnatural flow conditions.

Another characteristic is found in the fact that while the pool varies in depth, the increase is upwardly, with the increase in the direction of advance of the pool, the bottom of the pool remaining constantly on the same plane, the plane which corresponds to the plane of the bottom face of the sheet during its travel as a sheet. Hence, there is no change in direction of travel of the metal after it reaches the pool, such as might tend to set up conditions of strain in the sheet.

Other characteristics are present and will be referred to hereinafter.

To these and other ends, therefore, the nature of which will be readily understood as the invention is hereinafter more fully disclosed, said invention consists in the improved methods and arrangements and combinations of parts and structures, hereinafter more fully described, illustrated in the accompanying drawings, and more particularly pointed out in the appended claims.

In the accompanying drawings, in which similar reference characters indicate similar parts in each of the views—

Figure 1 is a sectional view, partly in elevation, showing portions of a system designed for carrying out the general embodiments of the present invention.

Fig. 2 is a plan view showing parts of the apparatus employed in the system of Fig. 1.

Fig. 3 is a transverse sectional view taken through the table with the section extending through the pool.

Fig. 4 is a detail sectional view showing the pass.

Fig. 5 is a detail sectional view looking toward the supply stream, the section extending transverse of the pool.

Fig. 6 is a diagrammatic view showing a form of drive for the table.

Fig. 7 is a diagrammatic view indicating a method for controlling the speed to compensate for changes in consistency.

For the purpose of illustrating the invention, the drawings have the general characteristics of the installation to which reference has been made, the details of construction, etc., however, being omitted and many shown in simplified form, it being understood, of course, that each installation of the invention will carry its own detail structural characteristics designed to meet the individual conditions of the installation, and will be designed more particularly to meet these conditions. The drawings, therefore, are not to be considered as more than illustrative of the invention.

The melting and refining tank is indicated at A, and shown as provided with the discharge spout $a$, the latter being provided with a gate $a'$ for controlling the discharge of the molten metal from the tank; two of these gates are shown in order to provide a reserve gate formation. It will be understood, of course, that these parts are of any preferred construction and arrangement designed to provide a continuous flow of the molten metal in a generally regulated amount.

B indicates the leer of suitable construction and length, the leer carrying a suitable sheet-advancing arrangement, shown as in the form of rolls $b$ suitably supported and positively driven. In practice, rolls $b$ have been arranged in sets or units with the rolls of one unit spaced an increased distance over those of another unit, as indicated in Fig. 7, for instance, the increase being toward the discharge end of the leer. To drive the rolls one or more motor-driven shafts $b'$ may be employed, each roll having an operative connection with the shaft—as by a worm-drive arrangement, for instance—the arrangement being such as to bring about conditions in which the sheet is properly advanced through the leer without placing any material drawing strain on the sheet and without tending to set up conditions that would cause the sheet to become "piled up" within the leer. A single shaft may drive all of the rolls, with the shaft operated by a motor $b^2$, but it is preferred to employ a plurality of shafts and motors with the latter synchronized in such manner as to set up the desired speed conditions within the units.

The sheet forming portion of the apparatus is indicated generally at C in Fig. 1, wherein is shown a simplified arrangement for carrying out the invention. This portion consists generally of a table $c$ and a roller $c'$, the table being in the form of an endless member having a horizontal flight that serves the function of the table and above which is positioned roller $c'$ to produce therebetween the conditions of a pass $c^2$.

15 indicates a frame carrying shafts 16 and 17, shaft 16 being driven by a motor 18, shaft 17 being driven from shaft 16. Shafts 16 and 17 are provided with sprocket wheels 19 and 19$^a$, respectively, over which are trained a pair of complemental chain-like formations 20, these making up an endless-chain arrangement which is also trained over an idle shaft 2˙ and its sprocket wheels 21$^a$.

The links which form the chain 20 are adapted to carry individual plates 22 of suitable width and having a length such as to produce the width of the table $c$, the frame 15 having guides 23 over which plates 22 travel in producing the horizontal flight $x$ of the table. For efficient service, the chain formations are preferably arranged in the manner shown in Fig. 1, this arrangement enabling the plates, in rounding sprockets 19ᵃ moving in such manner as to not affect the glass sheet formation, the plates simply moving away from the sheet without passing above the plane that represents the top plane of the table; this produces a different effect at the opposite end of the flight—shown at the left of Fig. 1—but this is immaterial because the plates must move a considerable distance in the flight $x$ before receiving the molten metal.

As will be understood, the fact that shaft 16 is the drive shaft for the endless-chain table formation tends to set up the conditions of a "push" action within the horizontal flight $x$; in other words, instead of the table being advanced by drawing or pulling the plates in the direction of flight $x$, the plates are advanced by being pushed from the rear, the result being that the table top is maintained free from joint openings along the longitudinal meeting edges of adjacent plates. To prevent conditions of buckling in such surface, the structure is arranged to also set up an advancing action by drive of shaft 17, but the drive of the latter shaft is had from shaft 16, with the drive connections arranged to set up conditions of compensation, a simplified arrangement being shown in Fig. 6.

This compensated drive is provided by the use of a sprocket chain connection between the shafts independent of the endless table formation, the chain being indicated at 24. To support chain 24, shaft 16 carries a loose sprocket formation 25, and shaft 17 carries a fixed sprocket 26, chain 24 being trained on these sprockets 25 and 26. Sprocket 25 is driven by a drive member 25ᵃ keyed or otherwise secured to shaft 16, element 25ᵃ being located in a recess of sprocket 25, a spring 25ᵇ being interposed between the element and sprocket, the arrangement being such that advance of shaft 16 causes similar advance of the element 25ᵃ and the motion of the latter is communicated to sprocket 25 through spring 25ᵇ; the resultant movement of chain 24 drives shaft 17 through sprocket 26. As shown in Figs. 1 and 6 the sprockets of shaft 16 are of different size from those of shaft 17, and the sprockets of the two chain systems differ from each other as to size, but the arrangement is such that the same relation between the number of teeth on the sprockets is maintained in both chain systems. For instance, with sprockets 19 carrying ten teeth and sprockets 19ᵃ seven teeth, the number of teeth of sprocket 25 will be ten and that of sprocket 26 will be seven. This provides for a definite drive relation between the two shafts 16 and 17, spring 25ᵇ setting up the compensating action active to prevent pulling strains or buckling in the horizontal flight $x$.

As shown in Fig. 2, roller $c'$ is driven from shaft 16, through suitable speed reduction gearing, the arrangement being such that the surface speed of the roller is equal to the speed of advance of the table $c$, the two elements operating in synchronism to produce a pass of proper characteristic. Roller $c'$ is preferably of the water-cooled type, and table $c$ is also preferably water-cooled, Fig. 1 illustrating, at 27, a suitable spraying instrumentality supplied from a suitable source of supply, not shown.

It is, of course, impossible to present an exact delineation of the configuration or appearance of the pool of metal from which the sheet is formed. In the drawings this has been approximated to a certain extent, and indicated at $p$, the downflowing or gravity stream being indicated at $p'$.

As will be understood, stream $p'$ is of an entirely different cross-sectional contour from that of the sheet, the width of the stream approximating thirty per centum of the width of the sheet, while the stream thickness is correspondingly thicker than the sheet; the one characteristic in common between the sheet and stream is the fact that the content per unit of length of the stream will equal the content of the sheet in the same unit of length—in other words, the supply of metal provided by the stream balances the amount of metal leaving the pool in the form of the sheet formation.

Both table $c$ and roller $c'$ are moving continuously in an advancing direction, so that the pool content is being constantly advanced toward the pass; and while there is this constant advance of the metal there is also a constant addition in the form of the stream content which is flowing on to the top of the pool and spreading out laterally so as to produce the heel effect shown in Fig. 1 and the mat-like effect shown in Fig. 2 about the stream.

It is obvious, of course, that there is a time factor present between the instant of joining the pool and the instant when the content reaches the pass, and during this time interval the molten metal will tend to flow laterally. If the table were stationary, there would be a gradual thinning of the pool thickness as the metal flow would increase the area of contact with the table. But owing to the fact that the table is constantly moving, and a supply of similar characteristic is being added constantly, a section transverse of the pool will present a substantially constant cross-sectional contour, even though this lateral flow of metal continues, due to the fact that the advancing cross-section is being replaced by a similarly-produced cross-section of metal. And this is made possible by the fact that the contour dimensions of the stream vary very materially from those of the sheet, so that the pool supply is of fairly narrow width, leaving a considerable open flow-zone on each side without passing outside of the desired sheet width.

Since the advance of pool content is toward the mouth presented by the curved face of the roller and the straight face of the table, it will be understood that there is set up a resistance to advance of the upper portion of the pool, the result being that the pool increases in depth toward the mouth, the increase, however, being in an upward direction, so that the metal must flow downward through a greater distance and hence more rapidly as the thickness increases. And yet, the flow is the natural flow of the metal resisted only in the direction of advance by the form of the mouth to the pass as set up by the curvature of roller $c'$—a resistance that produces this characteristic of an increasing depth to the pool and which tends to direct the flow laterally to obtain the desired sheet width.

As heretofore pointed out, the arrangement sets up the conditions of an unconfined pool of the metal, the content of the pool being advanced by a pushing action rather than being drawn, it being readily understood that the action of the table is that of simply carrying the content forward, the last added increment of the metal being added to the pool at the rear of the latter and in such manner as to not materially disturb the pool content.

If desired, although such arrangement is not compulsory, a roller 30 may be mounted in the path of travel of the formed sheet, intermediate roller $c'$ and the entrance to the leer, roller 30 being used for the purpose of smoothing out any slight irregularities that might appear on the upper surface of the sheet, the roller being adjustable vertically to provide the proper width of pass between it and the table.

One of the characteristics that has been manifested by the use of the invention is that the falling stream does not act to produce strains or generate bubbles, etc. Occasional bubbles have been noted, but these were noted during travel of the metal in the spout and were not broken up by the falling stream action. It was possible to note the course of these bubbles in traversing the pool and it is found that these generally appear at or adjacent an edge of the sheet, a bubble of this kind serving as an excellent indicator to note the characteristics of the metal flow in traversing the pool, this demonstrating the freedom of such flow. It has been found that there is no trapping of air action produced by the stream in joining the pool, and the fact that bubbles within the stream are maintained in the pool is indicative of the fact of no material disturbance of the metal of the stream and pool by reason of the gravitating flow of metal in the stream.

The particular shape of the pool may vary in use by reason of variation in the consistency of the molten metal. The heel may vary in projection, depending on such consistency, as may other portions of the pool. Since it is desired to maintain the sheet width practically constant, it is essential that this variation be compensated as far as possible. This can be done by varying the speed of travel of the table and roller $c'$, through varying the speed of the motor which drives shaft 16, and such variation should also extend to the rolls the the leer so that the latter will advance the sheet at the proper speed to prevent piling up or a thinning of the sheet through a tendency to draw.

This control can be provided by a suitable controlling rheostat 31 as indicated in Fig. 7, this device providing similar effect on each of the driving motors involved. Regulation of the rheostat may be manual—the attendant making frequent inspection of the sheet to determine variations in sheet width, and shifting the rheostat to vary the speed when necessary; obviously, a suitable detector may be applied beyond the forming pass, this detector being arranged to operate or control the changes in the rheostat, the variations being controlled by variation in the width of the sheet.

The surface of the pool is maintained at proper temperature by the use of one or more burners 32 properly positioned with respect to the pool. In practice these are shiftable in position to aid in permitting manipulation toward maintaining a proper consistency to the metal of the pool.

While we have herein disclosed one or more ways in which the fundamental characteristics of the present invention may be carried out, together with an embodiment of apparatus adapted to practice the invention, it will be readily understood that variations or modifications thereof may be found desirable or essential in meeting the various exigencies of installation and of use, and we desire to be understood as reserving the right to make any and all such changes and modifications as may be found desirable or necessary, in so far as the same may fall within the spirit and scope of the invention as expressed in the accompanying claims when broadly construed.

Having thus described our invention, what we claim as new is:

1. In the art of producing continuous sheet glass, the method of forming the sheet which consists in establishing an unconfined pool of the molten metal on a flat traveling surface in advance of and leading to a forming pass with the pass dimensions substantially equal to the thickness of the sheet and greater than the width of the sheet, and continually passing metal from the pool through the pass to form the sheet, whereby the unconfined characteristic of the pool will be maintained within the pass with respect to the sheet edges, the pool characteristic being maintained by a continuous supply of metal thereto, the width of the sheet being produced by the natural flow of metal within the pool.

2. In the art of producing continuous sheet glass, the method of forming the sheet which consists in establishing an unconfined pool of the molten metal on a flat traveling surface in advance of and leading to a forming pass, the bottom of the pool extending on a horizontal plane, the pass dimensions being such as to produce the approximate sheet thickness and preserve the unconfined characteristic of the pool with respect to the sheet edges, and forming the sheet by continually passing metal from the pool through the pass while maintaining the pool characteristic by a continuous supply of metal to the pool, the width of the sheet being produced by the natural flow of metal within the pool.

3. In the art of producing continuous sheet glass, the method of forming the sheet which consists in establishing an unconfined pool of the molten metal on a flat traveling surface in advance of and leading to a forming pass, the bottom of the pool extending on a horizontal plane which represents the plane of the bottom surface of the glass sheet, the pass dimensions being such as to produce the approximate sheet thickness and preserve the unconfined characteristic of the pool within the pass with respect to the sheet edges, and forming the sheet by continually passing metal from the pool through the pass while maintaining the pool characteristic by a continuous supply of metal to the pool, the width of the sheet being produced by the natural flow of metal within the pool.

4. In the art of producing continuous sheet glass, the method of forming the sheet which consists in establishing an advancing and unconfined pool content of the molten metal on a flat traveling surface in advance of and leading to a forming pass, forming the sheet by passing metal of the pool through the pass, and maintaining the position and amount of metal in the pool by supplying molten metal to the pool concurrently with the forming of the sheet and in amount equal to that leaving the pool through the pass, the pass dimensions maintaining the unconfined characteristic with respect to the sheet edges, whereby the width of the sheet will be produced by the natural flow of the metal within the pool.

5. In the art of producing continuous sheet glass, the method of forming the sheet which consists in establishing an unconfined pool of the molten metal on a flat traveling surface in advance of and leading to a forming pass, the pool having an approximate definite external contour configuration, forming the sheet by passing metal from the pool through the pass, and approximately maintaining the constancy of the configuration during sheet formation by advancing the pool content toward the pass concurrently with the addition of molten metal to the pool equal in amount to that passing through the pass, the unconfined characteristic extending into the pass.

6. In the art of producing continuous sheet glass, the method of forming the sheet which consists in establishing an unconfined pool of the molten metal on a flat traveling surface in advance of and leading to a forming pass, the pool having a width characteristic generally increasing in the direction of the pass with greatest width within the pass, forming the sheet by passing metal from the pool through the pass, and maintaining the width characteristic substantially constant during sheet formation by advancing the pool content toward the pass concurrently with the addition of molten metal to the pool equal in amount to that passing through the pass while controlling the time length of travel of the pool content between the point of metal addition to the pool and the pass, the unconfined characteristic of the metal extending into the pass.

7. In the art of producing continuous sheet glass, the method of forming the sheet which consists in establishing an unconfined pool of the molten metal in advance of and leading to a forming pass, the pool having a width characteristic generally increasing in the direction of the pass with the greatest width within the pass, forming the sheet by passing metal from the pool through the pass, and maintaining the width characteristic substantially constant during sheet formation by advancing the pool content horizontally toward the pass concurrently with the addition of molten metal to the pool equal in amount to that passing through the pass while controlling the time length of travel of the pool content between the point of metal addition to the pool and the pass, the unconfined characteristic of the metal extending into the pass.

8. In the art of producing continuous sheet glass, the method of forming the sheet which consists in establishing an unconfined pool of the molten metal in advance of and leading to a forming pass, the pool having its bottom extending on a single horizontal plane and having a depth characteristic varying in the direction of the pass, forming the sheet by passing metal from the pool through the pass, and maintaining the depth characteristic substantially constant during sheet formation by advancing the pool content horizontally toward the pass concurrently with the addition of molten metal to the pool equal in amount to that passing through the pass while controlling the time length of travel of the pool content between the point of metal addition to the pool and the pass, the unconfined characteristic of the metal extending into the pass.

9. In the art of producing continuous sheet glass, the method of forming the sheet which consists in establishing an unconfined pool of the molten metal in advance of and leading to a forming pass, the pool having its bottom extending on a single horizontal plane and having a depth characteristic generally increasing in the direction of the mouth of the pass, forming the sheet by passing metal from the pool through the pass, and maintaining the depth characteristic substantially constant during sheet formation by advancing the pool content horizontally toward the pass concurrently with the addition of molten metal to the pool equal in amount to that passing through the pass while controlling the time length of travel of the pool content between the point of metal addition to the pool and the pass.

10. In the art of producing continuous sheet glass, the method of forming the sheet which consists in establishing a horizontally-advancing unconfined pool content of molten metal in advance of and leading to a forming pass, the metal for the pool being supplied by a vertically-flowing stream of the metal entering the pool remote from the pass, forming the sheet by passing metal from the pool through the pass, the approximate thickness of the sheet being produced by dimensions of the pass and the width of the sheet being produced by natural flow of the metal in the pool during advance of the pool content to the sheet-thickness-determining portion of the pass.

11. In the art of producing continuous sheet glass, the method of forming the sheet which consists in establishing a horizontally-advancing unconfined pool content of molten metal in advance of and leading to a forming pass, forming the sheet by passing metal from the pool through the pass, the bottom of the pool extending on a single horizontal plane, the metal for the pool being supplied by a vertically-flowing stream of the metal entering the pool remote from the pass and above such horizontal plane, forming the sheet by passing metal from the pool through the pass, the approximate thickness of the sheet being produced by dimensions of the pass and the width of the sheet being produced by natural flow of the metal in the pool during advance of the pool content to the sheet-thickness-determining portion of the pass.

12. In the art of producing continuous sheet glass, the method of forming the sheet which consists in establishing a horizontally-advancing unconfined pool content of molten metal in advance of and leading to a forming pass, the bottom of the pool extending on a single horizontal plane corresponding with the plane of the bottom of the pass and of the under surface of the formed sheet, the metal for the pool being supplied by a vertically-flowing stream of the metal entering the pool remote from the pass with the pool extending beyond such stream, whereby the pool content will form a body of pad-like characteristic on to which the stream passes in entering the pool, forming the sheet by passing metal from the pool through the pass, the approximate thickness of the sheet being produced by dimensions of the pass and the width of the sheet being produced by natural flow of the metal in the pass above such plane during advance of the pool content to the sheet-thickness-determining portion of the pass.

13. In the art of producing continuous sheet glass, the method of forming the sheet which consists in establishing a horizontally-advancing unconfined pool content of molten metal in advance of and leading to a forming pass, the metal for the pool being supplied by a vertically-flowing stream of the metal entering the pool remote from the pass, the width of the stream being materially less than the width of the sheet and disposed substantially symmetrical to a line corresponding to a median line of the sheet, forming the sheet by passing metal from the pool through the pass, the approximate thickness of the sheet being produced by action of the pass, and the width of the sheet being produced by natural flow of the metal in the pool during advance of the pool content to the sheet-thickness-determining portion of the pass.

14. In the art of producing continuous sheet glass, the method of forming the sheet which consists in establishing a horizontally-advancing unconfined pool content of molten metal in advance of and leading to a forming pass, the metal for the pool being supplied by a vertically-flowing stream of the metal entering the pool remote from the pass, the width of the stream being materially less than the width of the sheet and disposed substantially symmetrical to a line corresponding to a median line of the sheet, forming the sheet by passing metal from the pool through the pass, the approximate thickness of the sheet being produced by action of the pass and the width of the sheet being produced by natural flow of the metal in the pool during advance of the pool content to the sheet-thickness-determining portion of the pass, such natural flow being generally symmetrical to such line.

15. In the art of producing continuous sheet glass, the method of forming the sheet which consists in establishing a horizontally-advancing unconfined pool content of molten metal on a flat traveling surface in advance of and leading to a forming pass, forming the sheet by passing metal from the pool through the pass, maintaining an approximately constant value of metal within the pool by supplying molten metal to the pool during sheet formation and in amount equal to that passing from the pool, and controlling the width of the sheet by the speed of advance of the pool content to the pass.

16. In combination with a melting furnace having a spout for discharging molten glass, and a leer, of means interposed between the spout and the leer for establishing an unconfined pool of the molten metal in advance of and leading to the forming pass with the pool supplied by the metal from the spout, and with the pool content continually advanced horizontally to carry it to, into and through the pass, said means including an advancing table formation having a flight extending in a horizontal plane and forming the lower wall of the pass, and an upper wall for the pass, said formation serving as the support for the pool content to and through the pass and for the formed sheet in advance of entrance to the leer.

17. Means as in claim 16 characterized in that the upper wall of the pass is provided by a rotating roller, the roller and table formation being operatively connected to provide equal surface-advancing speeds.

18. Means as in claim 16 characterized in that the upper wall of the pass is provided by a rotating roller having a peripheral speed equal to the advancing speed of the table formation, the roller and table formation being active to produce a pass of greater length in the direction of roller axis than the width of the sheet being formed, thereby maintaining the unconfined characteristic of the pool within the pass with respect to the width dimension of the sheet.

19. Means as in claim 16 characterized in that the table formation includes an endless succession of plates of relatively narrow dimension in the direction of formation advance and with the horizontal flight including a number of such plates guided to travel in such plane, the guiding means having a length to position the plates in such plane in advance of reaching the point of metal supply and beyond the pass station with the plates maintained in edge contact.

20. Means as in claim 16 characterized in that the table formation includes an endless succession of plates movable in the plane of such horizontal flight in the direction of advance of the pool, the power for advancing the plates being applied at a point to cause each plate to be active in advancing the plates in advance of it on the flight, whereby the table formation will be advanced by a "pushing" action.

21. Means as in claim 16 characterized in that the table formation includes an endless succession of plates movable in the plane of such horizontal flight in the direction of advance of the pool, the power for advancing the plates being applied at a point to cause each plate to be active in advancing the plates in advance of it in the flight, whereby the table formation will be advanced by a "pushing" action, means being provided to prevent buckling of the formation while active as the support for the pool and sheet.

22. Means as in claim 16 characterized in that the upper wall of the pass is provided by a rotating roller driven in synchronism with the table-formation to produce equal speed characteristics to the upper and lower walls of the pass, and an additional roller operative upon the formed sheet while the sheet is supported by the table formation to produce the finished upper-surface characteristic to the formed sheet.

23. In combination with a melting furnace having a spout for discharging molten glass, and a leer, of means interposed between the spout and the leer for establishing an unconfined pool of the molten metal in advance of and leading to the forming pass with the pool supplied by the metal from the spout and with the pool content continually advanced horizontally to carry it to, into and through the pass, said means including an advancing support for the metal of the pool operative as the lower wall of the pass, and a roller forming the upper wall of the pass and driven synchronously with the support, and means for controlling the width of the sheet by controlling the advancing speed of the support and roller.

24. A combination as in claim 23 characterized in that the controlling means is active in the control of the speed of travel of the sheet within the leer.

25. In the art of producing continuous sheet glass, a source of supply for the molten metal, said source including a permanently positioned discharge spout, an advancing support located below the spout to receive the molten metal from the spout to produce an unconfined pool upon said support, said support being positioned to advance the pool content in a horizontal plane toward, into and beyond a forming pass of which the support forms the lower wall, a rotating roller forming the upper wall of the pass, said pass having a width greater than the width of the sheet being formed, the delivery end of the spout being spaced above the support and the pool thereon a distance sufficient to provide a gravity flow of metal from the spout to the pool, the active width of the spout being materially less than the width of the sheet to produce a supply stream of metal of less width than the sheet, the distance between the supply stream and the forming pass being such as to permit natural flow of the metal in the pool during travel of the pool content toward and into the pass.

In testimony whereof we affix our signatures.

CLARENCE W. AVERY.
EDWARD T. BROWN.